United States Patent
Yang

(10) Patent No.: US 7,957,600 B2
(45) Date of Patent: Jun. 7, 2011

(54) METHODS AND SYSTEMS FOR RATE-DISTORTION OPTIMIZED QUANTIZATION OF TRANSFORM BLOCKS IN BLOCK TRANSFORM VIDEO CODING

(75) Inventor: Kyeong Ho Yang, Freehold, NJ (US)

(73) Assignee: ARRIS Group, Inc., Suwanee, GA (US)

( * ) Notice: Subject to any disclaimer, the term of this patent is extended or adjusted under 35 U.S.C. 154(b) by 1040 days.

(21) Appl. No.: 11/737,632

(22) Filed: May 8, 2007

(65) Prior Publication Data
US 2008/0279466 A1 Nov. 13, 2008

(51) Int. Cl.
*G06K 9/36* (2006.01)
(52) U.S. Cl. .......................................... 382/232
(58) Field of Classification Search ................ 382/232, 382/236, 240, 248, 253; 348/384.1, 387.1, 348/390.1, 404.1; 375/240, 240.02; 358/426.01, 358/426.03, 426.06, 426.07; 341/106, 107
See application file for complete search history.

(56) References Cited

U.S. PATENT DOCUMENTS

| | | | | | |
|---|---|---|---|---|---|
| 5,881,176 | A | * | 3/1999 | Keith et al. | 382/248 |
| 6,154,572 | A | * | 11/2000 | Chaddha | 382/253 |
| 6,510,247 | B1 | * | 1/2003 | Ordentlich et al. | 382/232 |
| 6,959,116 | B2 | * | 10/2005 | Sezer et al. | 382/251 |
| 7,577,305 | B2 | * | 8/2009 | Srinivasan | 382/238 |
| 2004/0114817 | A1 | | 6/2004 | Jayant et al. | |
| 2006/0215919 | A1 | | 9/2006 | Srinivasan | |

OTHER PUBLICATIONS

International Search Report and Written Opinion issued for Application No. PCT/US2008/62167 by the International Searching Authority, Jul. 14, 2008, 7 pages.

* cited by examiner

*Primary Examiner* — Jose L Couso
(74) *Attorney, Agent, or Firm* — Troy A. Van Aacken; Robert J. Starr

(57) ABSTRACT

Provided are methods and systems for rate-distortion optimized quantization and for skipping transform blocks that can take into account the rate-distortion tradeoff as well as the perceptual quality of reconstructed video.

8 Claims, 10 Drawing Sheets

Y  $C_b$  $C_r$

4:2:0

Y  $C_b$  $C_r$

4:2:2

Y  $C_b$  $C_r$

4:4:4

Y　　　　　　　　Cb　　　　　　Cr
　　　　　　　　4:2:0

Y　　　　　　　　Cb　　　　　　Cr
　　　　　　　　4:2:2

Y　　　　　　　　Cb　　　　　　Cr
　　　　　　　　4:4:4

FIG. 6A
FIG. 6B
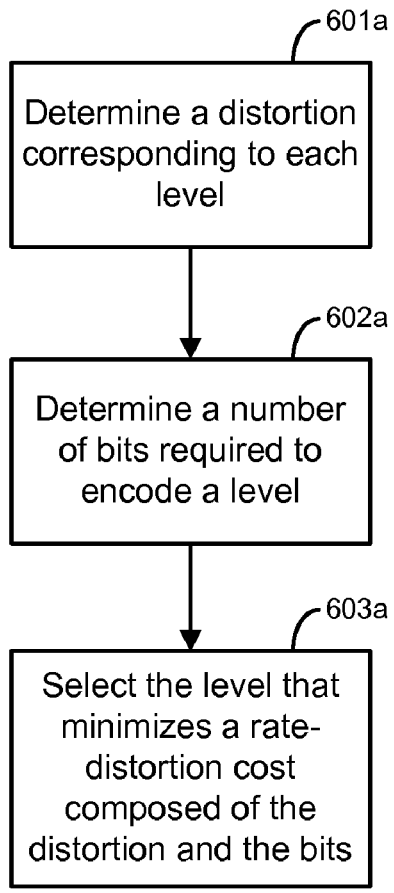
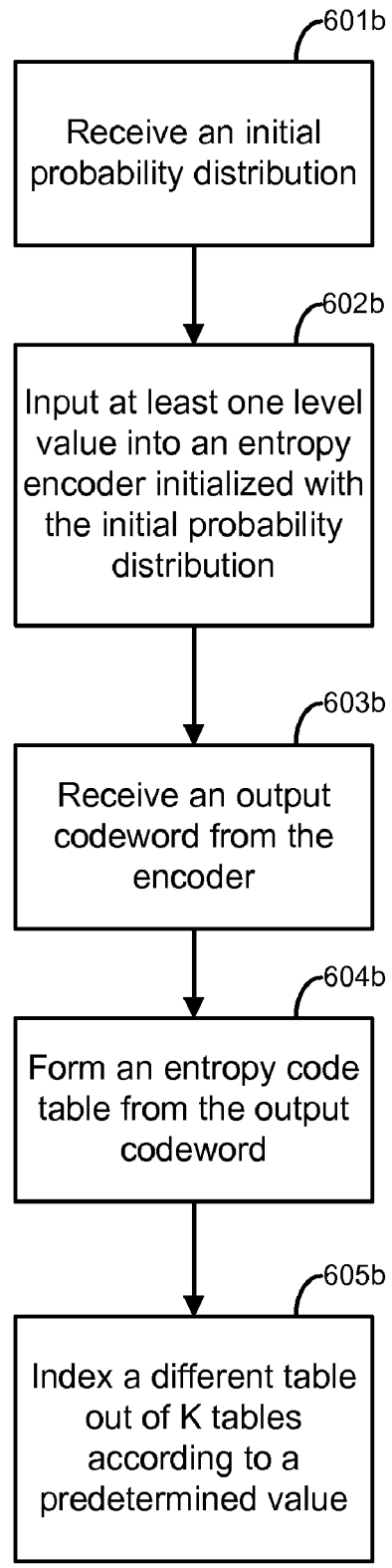

METHODS AND SYSTEMS FOR RATE-DISTORTION OPTIMIZED QUANTIZATION OF TRANSFORM BLOCKS IN BLOCK TRANSFORM VIDEO CODING

BACKGROUND

Most video coding standards including MPEG and H.26x families [1-3] employ quantization of transform blocks followed by entropy encoding of the quantization levels to reduce the number of bits to represent them. Those standards define only inverse quantization ($Q^{-1}$), i.e., a way of mapping the quantization levels back to transform coefficients and leave the forward quantization (Q) to an encoder's choice. The most common schemes for quantizing the transform coefficient, TC, with a given quantization step size, stepSize, can be represented as in Eq. (1) and Eq. (2), respectively for the case of without and with dead zone around zero:

$$\text{level} = Q(|TC|) = (|TC| + \alpha \ast \text{stepSize}) / \text{stepSize}, \quad \text{Eq. (1)}$$

$$\text{level} = Q(|TC|) = 0, \text{ if } |TC| < \beta \ast \text{stepSize, otherwise}$$
$$(|TC| - \beta \ast \text{stepSize} + \alpha \ast \text{stepSize}) / \text{stepSize} \quad \text{Eq. (2)}$$

where "/" represents the integer division operation, $\alpha$ is to exploit the characteristic of the probability distribution of the transform coefficient, and $\beta$ is introduced to make a dead zone around zero. In case of the uniform distribution of probability, all the levels have the same probability and so are encoded with the same number of bits. In this case, the best performance is shown at $\alpha = 0.5$. But the distribution of the transform coefficient tends to show Laplacian or Exponential distribution that is far different from the uniform one. To reflect this distribution, lower levels are usually represented in the less number of bits and therefore $\alpha$ is set to a number smaller than 0.5. $\beta$ defines the size of dead zone and is given by the standards. The $\beta$ is set to 0 in H.264 quantization since the standard doesn't employ a dead zone around zero [3, 4]. The two quantization schemes are also illustrated in FIG. 1A and FIG. 1B.

What is needed to achieve better coding performance is joint optimization of quantization and entropy coding. However, in many video coding systems including MPEG and H.26x families the entropy code tables and the inverse quantization process are already fixed, and the encoder is not allowed to change them. In this case, what the encoder needs to do is to optimize the quantization region for each level only. In such video coding systems, the quantization scheme is designed by using either one of the two functions in Eqs. (1) and (2) and selecting the value for $\alpha$ experimentally. This simple approach does not fully exploit the characteristic of the entropy coding system. What is needed is a quantization scheme that better exploits the entropy encoding scheme employed. What is also needed is a scheme that quantizes to zero all transform coefficients in blocks with small energy in the sense of rate-distortion optimization.

SUMMARY

Provided are methods and systems for rate-distortion optimized quantization and for skipping transform blocks that can take into account the rate-distortion tradeoff as well as the perceptual quality of reconstructed video. Provided are methods for rate-distortion optimized quantization comprising determining a distortion corresponding to each level, determining a number of bits required to encode a level by a table look-up using a plurality of entropy code tables, wherein designing the plurality of entropy code tables comprises receiving an initial probability distribution, inputting at least one level value into an entropy encoder initialized with the initial probability distribution, receiving an output codeword from the encoder, forming an entropy code table from the output codeword, and indexing a different table out of K tables according to a predetermined value, and selecting the level that minimizes a rate-distortion cost composed of the distortion and the bits.

Also provided are methods for rate-distortion optimized quantization comprising determining a distortion corresponding to each level, determining a number of bits required to encode a level comprising, receiving a set of current probability distributions, converting a quantization level into a series of bits, inputting a current bit into an entropy encoder with the set of current probability distributions, updating the set of current probability distributions according to the current bit processed, determining if the current bit is the last bit forming the quantization level, and receiving an output codeword from the encoder, and selecting the level that minimizes a rate-distortion cost composed of the distortion and the bits.

Also provided are methods for generating an entropy code table comprising receiving an initial probability distribution, inputting at least one level value into an entropy encoder initialized with the initial probability distribution, receiving an output codeword from the encoder, forming an entropy code table from the output codeword, and indexing a different table out of K tables according to a predetermined value.

Also provided are methods for skipping transform blocks comprising quantizing a transform coefficient in a transform block resulting in a quantized level, making a determination to send the quantized level to a decoder, wherein making a determination comprises determining a perceptual quality, determining a rate-distortion tradeoff, and skipping a transform block based on the determined perceptual quality and the determined rate-distortion tradeoff.

Additional advantages of the methods and systems will be set forth in part in the description which follows or may be implicit in the practice of the methods and systems. It is to be understood that both the foregoing general description and the following detailed description are exemplary and explanatory only and are not restrictive of the methods and systems.

BRIEF DESCRIPTION OF THE DRAWINGS

The accompanying drawings, which are incorporated in and constitute a part of this specification, illustrate embodiments of the methods and systems and together with the description, serve to explain the principles of the methods and systems:

FIG. 6A is a flow diagram illustrating steps in an exemplary method for rate-distortion optimized quantization;

FIG. 6B is a flow diagram illustrating steps in an exemplary method for determining a number of bits required to encode a quantization level;

DETAILED DESCRIPTION

Before the present methods and systems are disclosed and described, it is to be understood that this methods and systems is not limited to specific methods or specific components, and as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present methods and systems may be understood more readily by reference to the following detailed description of preferred embodiments of the methods and systems and the Examples included therein and to the Figures and their previous and following description.

Figure 2:
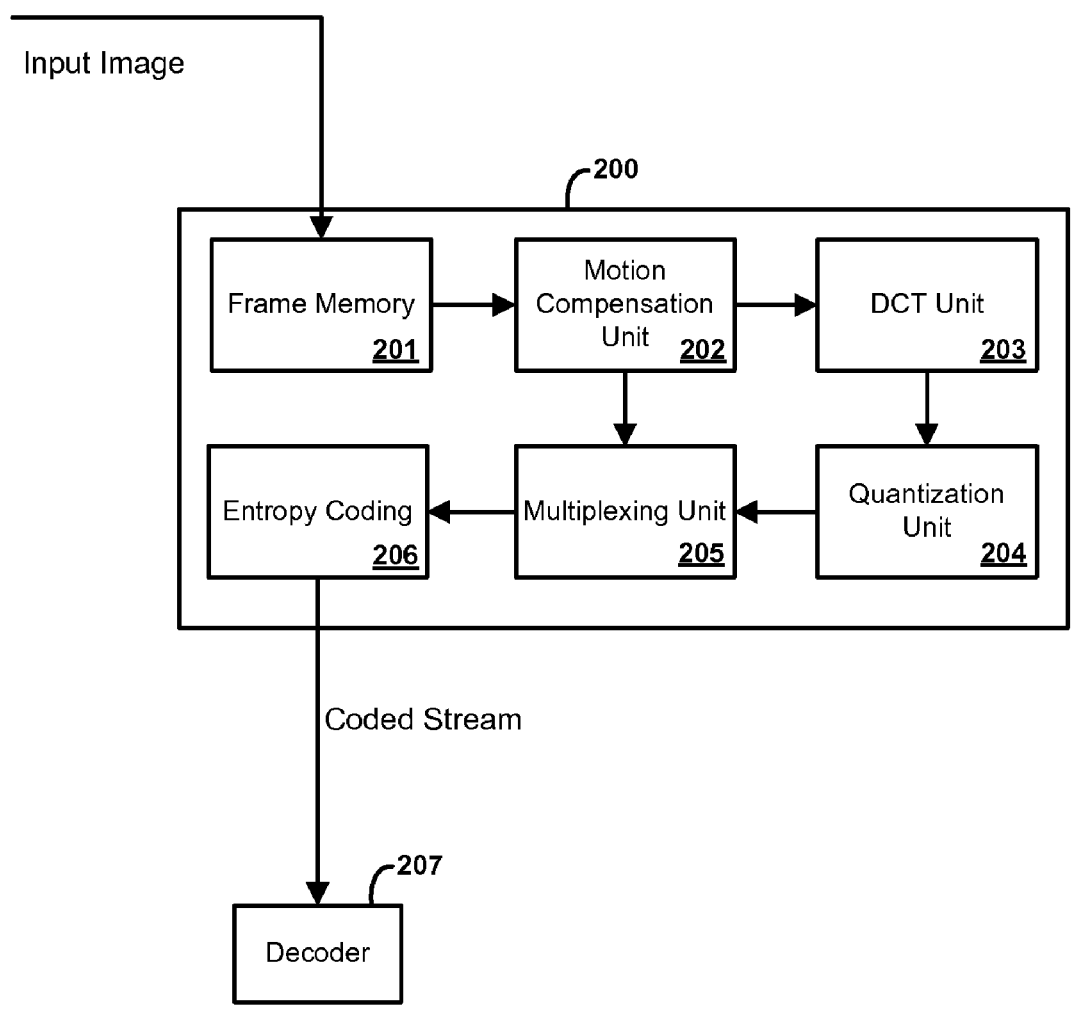
FIG. 2 illustrates an exemplary coding device 200 capable of implementing the disclosed methods.

FIG. 2 illustrates an exemplary coding device 200 capable of implementing the disclosed methods. This configuration can be realized by hardware means, e.g., by actions of one or more central processing units and memory of a computer, or by software means loaded into the memory. The exemplary coding device 200 is shown as a functional block configuration which is realized by cooperation between hardware components and software components. Such a functional block configuration can be realized by hardware components alone, software components alone, or various combinations thereof, which can be readily conceived by those skilled the art.

The coding device 200 according to the present embodiment can perform coding of moving images according to the MPEG (Moving Picture Experts Group) series standards (MPEG-1, MPEG-2, and MPEG-4) standardized by the international standardization organization ISO (International Organization for Standardization)/IEC (International Electrotechnical Commission), the H.26x series standards (H.261, H.262, H.263) standardized by the international standardization organization with respect to electric communication ITU-T (International Telecommunication Union-Telecommunication Standardization Sector), or the H.264/AVC standard which is a moving image compression coding standard jointly standardized by both the standardization organizations.

With the MPEG series standards, in a case of coding an image frame in the intra-frame coding mode, the image frame to be coded is referred to as the "I (Intra) frame". In a case of coding an image frame with a prior frame as a reference image, i.e., in the forward interframe prediction coding mode, the image frame to be coded is referred to as the "P (Predictive) frame". In a case of coding an image frame with a prior frame and an upcoming frame as reference images, i.e., in the bi-directional interframe prediction coding mode, the image frame to be coded is referred to as the "B frame".

Alternatively, with the H.264/AVC standard, image coding is performed using reference images regardless of the time at which the reference images have been acquired. For example, image coding may be made with two prior image frames as reference images. Also, image coding may be made with two upcoming image frames as reference images. Furthermore, the number of the image frames used as the reference images is not restricted in particular. For example, image coding may be made with three or more image frames as the reference images. Note that, with the MPEG-1, MPEG-2, and MPEG-4 standards, the term "B frame" represents the bi-directional prediction frame. On the other hand, with the H.264/AVC standard, the time at which the reference image is acquired is not restricted in particular. Accordingly, the term "B frame" represents the bi-predictive prediction frame.

While the description provided is directed to performing coding in units of frames, coding may also be performed in units of fields. Also, coding may also be performed in VOP increments as stipulated in the MPEG-4.

Figure 3A:
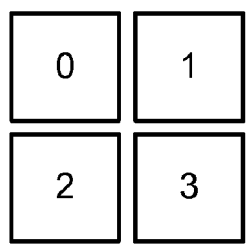
FIG. 3A illustrates exemplary macroblocks for MPEG2.
Figure 3A:
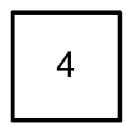
Figure 3A:
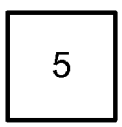
Figure 3A:
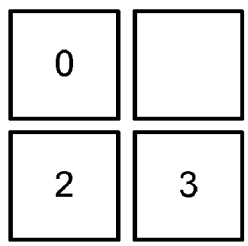
Figure 3A:
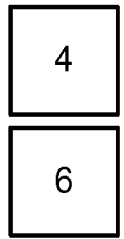
Figure 3A:
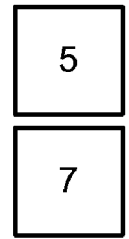
Figure 3A:
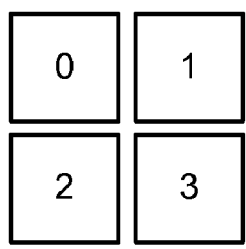
Figure 3A:
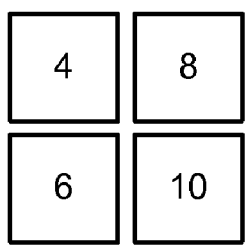
Figure 3A:
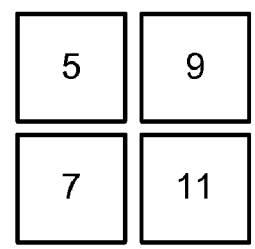
Figure 3B:
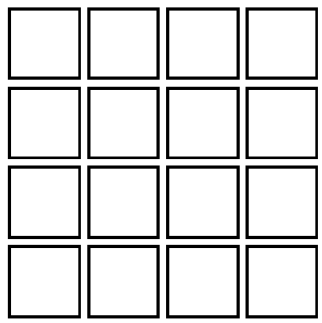
FIG. 3B illustrates exemplary macroblocks for H.264.
Figure 3B:
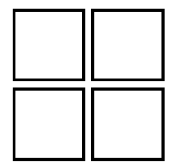
Figure 3B:
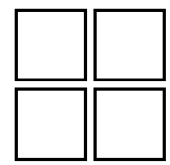
Figure 3B:
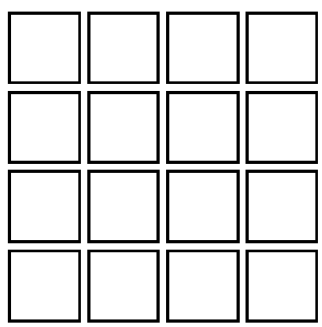
Figure 3B:
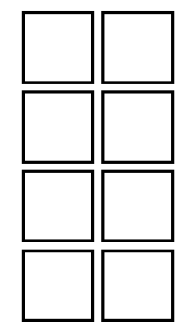
Figure 3B:
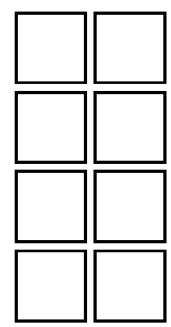
Figure 3B:
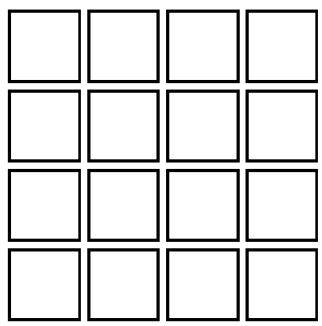
Figure 3B:
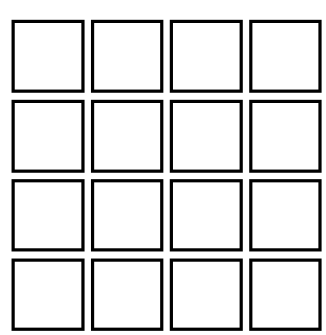
Figure 3B:
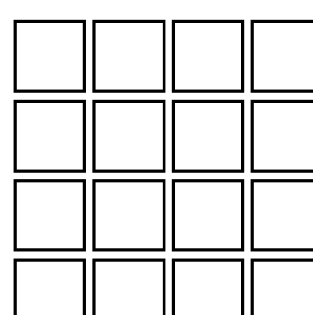

An exemplary video bitstream is made up of blocks of pixels, macroblocks (MB), pictures, groups of pictures (GOP), and video sequences. The smallest element, a block, consists of 8 lines×8 pixels per line. Blocks are grouped into macroblocks (MB), according to a predefined profile. Macroblocks can be represented in several different manners when referring to the YCbCr color space. FIG. 3A and FIG. 3B illustrate formats known as 4:4:4, 4:2:2, and 4:2:0 video. 4:4:4 is full bandwidth YCbCr video, and each macroblock consists of 4 Y blocks, 4 Cb blocks, and 4 Cr blocks. Being full bandwidth, this format contains as much information as the data would if it were in the RGB color space. 4:2:2 contains half as much chrominance information as 4:4:4, and 4:2:0 contains one quarter of the chrominance information.

For example, FIG. 3A illustrates that the 4:2:0 macroblock format has 4 blocks for luminance (Y), 1 block for red chrominance (Cr) and 1 block for blue chrominance (Cb). FIG. 3A further illustrates that the 4:2:2 MB format has 4 Y blocks, 2 Cr blocks, and 2 Cb blocks. FIG. 3A also illustrates that the 4:4:4 again has 4 Y blocks, but this version contains 4 Cr blocks and 4 Cb blocks. As can be seen, a 4:2:2 MB will contain 8 blocks and therefore 8×8×8 (512) pixels, a typical macroblock used in MPEG2.

For example, FIG. 3B illustrates another exemplary 4:2:0 macroblock format that has 16 blocks for Y, 4 blocks for Cr and 4 blocks for Cb. FIG. 3B further illustrates another 4:2:2 MB format that has 16 Y blocks, 8 Cr blocks, and 8 Cb blocks. FIG. 3B also further illustrates another 4:4:4 MB format that has 16 Y blocks, but this version contains 16 Cr blocks and 16 Cb blocks. As can be seen, a 4:2:2 MB will contain 32 blocks and therefore 32×4×4 (512) pixels, a typical macroblock used in H.264.

The coding device 200 receives the input signal, such as moving images in units of frames, performs coding of the moving images, and outputs a coded stream.

The input signal can be, for example, a 4:2:2 SDI (Serial Digital Interface), which can have 8- or 10-bit wordlength. MPEG uses only 8-bit resolution; therefore, a rounding stage can be used when the SDI signal contains 10-bit words. Most MPEG and H.264/AVC profiles operate with 4:2:0 sampling; therefore, a vertical low-pass filter/interpolation stage can be used if necessary. Rounding and color sub-sampling can introduce a small irreversible loss of information and a proportional reduction in bit rate. A raster scanned input format can be stored so that it can be converted to 8×8 or 4×4 pixel blocks. The moving image frames thus input can be stored in frame memory 201.

If required, a motion compensation unit 202 can perform motion compensation for each macro block of a P frame or B frame using a prior or upcoming image frame stored in the frame memory 201 as a reference image, thereby creating the motion vector and the predicted image. The motion compensation unit 202 performs subtraction between the image of the P frame or B frame to be coded and the predicted image, and supplies the subtraction image to a discrete cosine transform (DCT) unit 203. Furthermore, the motion compensation unit 202 can supply the motion vector information to a multiplexing unit 205.

The DCT unit 203 performs DCT processing for the image supplied from the motion compensation unit 202. The DCT unit 203 can transform the image (also referred to as picture) information to the frequency domain. The DCT unit 203 itself does not achieve any compression. The DCT unit 203 supplies the DCT coefficients thus obtained, to a quantization unit 204.

The quantization unit 204 performs quantization of the DCT coefficients. The DCT coefficients can be weighted and truncated, providing the first significant compression. The coefficients can then be zigzag scanned to increase the probability that the significant coefficients occur early in the scan. After the last non-zero coefficient, an EOB (end of block) code can be generated. The quantization unit 204 can supply the quantized DCT coefficients to the multiplexing unit 205.

The multiplexing unit 205 multiplexes the quantized DCT coefficients received from the quantization unit 204 and, if required, the motion vector information received from the motion compensation unit 202. The multiplexing unit 205 can then provide the multiplexed data to an entropy coding unit 206.

The entropy coding unit 206 allows for further coefficient data compression by, for example, run-length coding, variable-length coding, or both. If required, the entropy coding unit 206 can utilize motion vector information received from the multiplexing unit 205. In a variable bit-rate system, quantizing may be fixed, but in a fixed bit-rate system, a buffer memory can be used to absorb variations in coding difficulty. Highly detailed pictures will tend to fill the buffer, whereas plain pictures will allow it to empty. If the buffer is in danger of overflowing, the quantizing steps can be made larger, so that the compression factor is raised. The entropy coding unit 206 creates a coded stream with the coded frames being sorted in order of time. The entropy coding unit 206 can then provide the coded stream to a decoder 207.

At the decoder 207, the entropy coding of the coded stream can be reversed to reproduce the weighted coefficients. The coefficients can be placed in a matrix according to a zigzag scan, and inverse weighting can be applied to recreate the block of DCT coefficients. Following an inverse transform, an original 8×8 pixel block can be recreated.

Description has been made regarding coding processing for a P frame or B frame, in which the motion compensation unit 202 operates as described above. On the other hand, in a case of coding processing for an I frame, the I frame subjected to intra-frame prediction is supplied to the DCT unit 203 without involving the motion compensation unit 202.

The coding device 200 can be used to perform spatial compression on an input signal. Spatial compression refers to the space in a single picture and the goal of spatial compression is to minimize the duplication of data in each picture. Bit rate reduction in spatial compression is achieved by first transforming the video data from the space and time domain into the frequency domain using, for example, a discrete cosine transform (DCT) method and then applying quantization and entropy coding techniques to reduce the bit rate.

Figure 4:
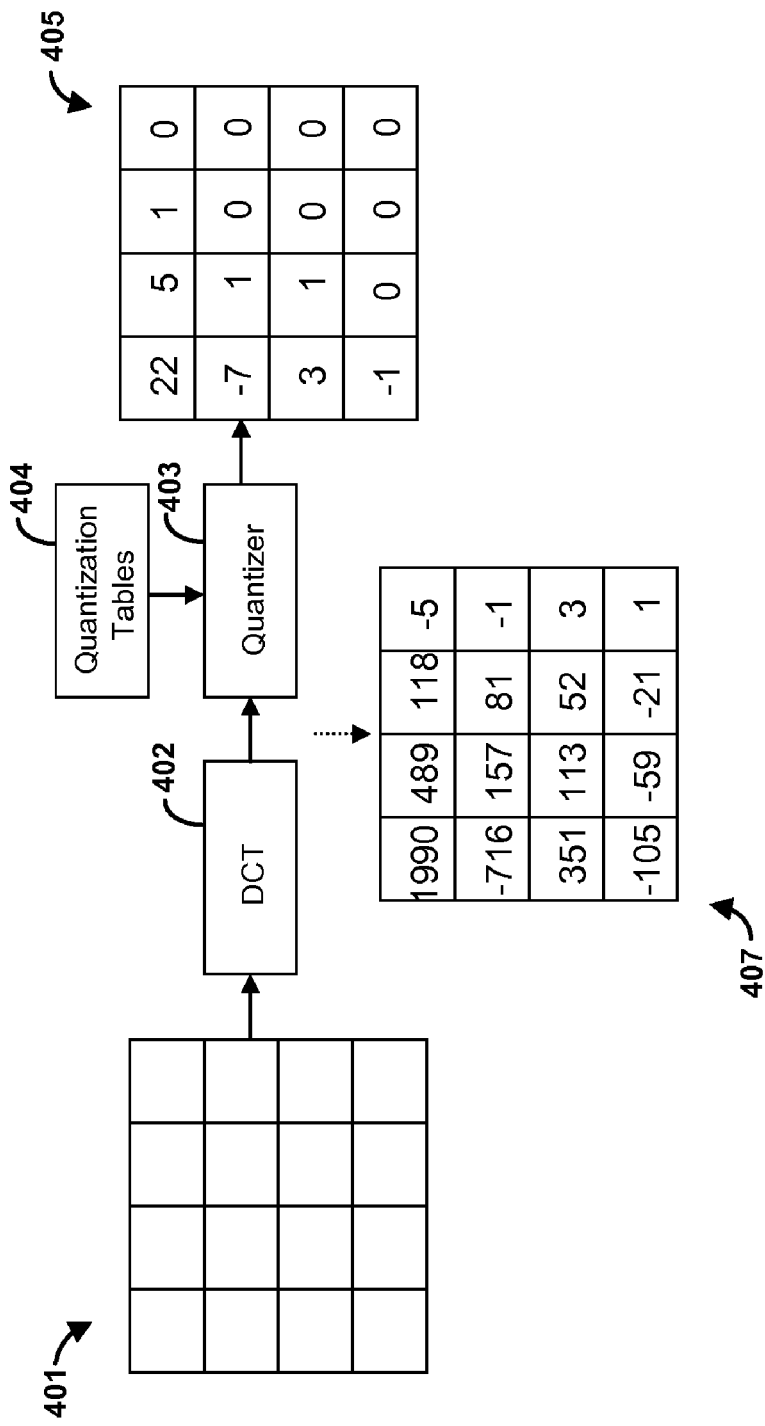
FIG. 4 illustrates steps in an exemplary quantization process.

Video is typically displayed on a time-based device, such as a waveform monitor, rather than on a frequency-based spectrum analyzer, however, to accomplish data reduction, video data must be transformed into the frequency domain. Since a complete frame can be split into blocks of 8×8 or 4×4 pixels depending on the standard and profile, this can be accomplished, for example as shown in FIG. 4, by using DCT 402 to transform the data in each block of 4×4 (or 8×8) pixels 401 into blocks of 4×4 (or 8×8) frequency coefficients 405. Since the transform requires multiplication by fractions, there is wordlength extension, resulting in coefficients that have longer wordlength than the pixel values. Typically an 8-bit pixel block results in an 11-bit coefficient block. Thus, a DCT does not result in any compression; in fact it results in the opposite. However, the DCT converts the source pixels into a form where compression is easier. Accordingly, no bits are discarded at this point. The result is an 4×4 (or 8×8) transform coefficient array in which the (0,0) element is the DC (zero-frequency) component and entries with increasing vertical and horizontal index values represent higher vertical and horizontal spatial frequencies. The value immediately to the right of the DC component can represent low frequency horizontal information. The value in the top right can represent high frequency horizontal information. Similarly, the bottom left value can represent high frequency vertical information. In the frequency domain, most of the high energy (and therefore most noticeable) picture elements are represented by low frequencies at the top left corner of the block, and the less important details are revealed as higher frequencies towards the bottom right as shown in the block 405. For color pictures, the color difference samples will also need to be handled. Y, Cb and Cr data can be assembled into separate 4×4 (or 8×8) arrays and transformed individually.

Many of the coefficients will have zero or near-zero values and, therefore, will not be transmitted. This fact results in significant compression that is virtually lossless. If a higher compression factor is needed, then the wordlength of the non-zero coefficients must be reduced. This reduction will reduce accuracy of these coefficients and will introduce losses into the process. With care, the losses can be introduced in a way that is least visible to the viewer.

After DCT encoding at 402, the DCT transformed values contain an accurate representation of an original macroblock. By applying an inverse DCT on the values the original pixels can be obtained. The DCT output can be stored as high precision (e.g. floating point) values. An exemplary matrix of DCT coefficients is indicated as 407. Quantization 403 is then performed to reduce the precision of the values. The quantization process can be weighted to reduce data in the high frequency areas, where the human eye is less sensitive. Quantization refers to storing the DCT value using a discrete number of bits, discarding the least significant information. More bits per pixel can be used to quantize the important low-frequency coefficients and fewer bits per pixel can be used for the high-frequency coefficients. A quantization table 404 is a matrix of integers that correspond to the results of the DCT. Each entry in this table can be an integer. To quantize the DCT data, the result of the DCT can be divided by the quantization value and the integer portion of the result is retained. Therefore, the higher the integer in the quantization table, the coarser and more compressed the result becomes. This is the first step in spatial bit rate reduction.

In the weighted quantization process, the coefficients from the DCT are divided by constants that are a function of two-dimensional frequency. Low-frequency coefficients will be divided by small numbers, and high-frequency coefficients will be divided by large numbers. Following the division, the result is truncated to the nearest integer. This truncation is a form of requantizing. In the absence of weighting, this requantizing would have the effect of uniformly increasing the size of the quantizing step, but with weighting, it increases the step size according to the division factor.

As a result, coefficients representing low spatial frequencies are requantized with relatively small steps and suffer little increased noise. Coefficients representing higher spatial frequencies are requantized with large steps and suffer more noise. However, fewer steps means that fewer bits are needed to identify the step and compression is obtained. In a decoder, low-order zeros will be added to return the weighted coefficients to their correct magnitude. They will then be multiplied by inverse weighting factors. Clearly, at high frequencies the multiplication factors will be larger, so the requantizing noise will be greater. Following inverse weighting, the coefficients will have their original DCT output values, plus requantizing error, which will be greater at high frequency than at low frequency.

As an alternative to truncation, weighted coefficients can be nonlinearly requantized so that the quantizing step size increases with the magnitude of the coefficient. This technique allows higher compression factors but worse levels of artifacts. Clearly, the degree of compression obtained and, in turn, the output bit rate obtained, is a function of the severity of the requantizing process. Different bit rates will require different weighting tables. The quantization table in use can be transmitted to the decoder, so that correct decoding is ensured.

Figure 5A:
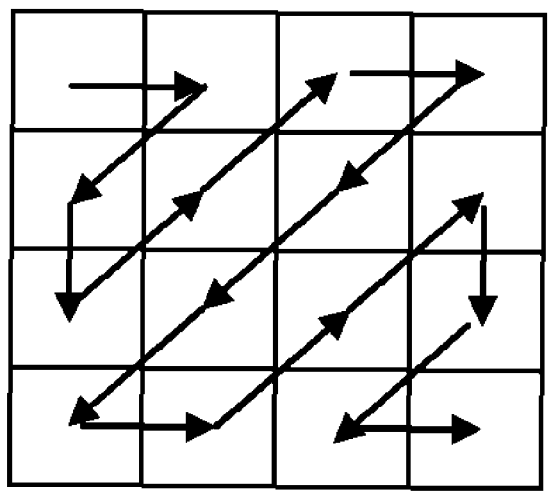
FIG. 5A illustrates a 45 degree diagonal zigzag scan of a 4×4 matrix.
Figure 5B:
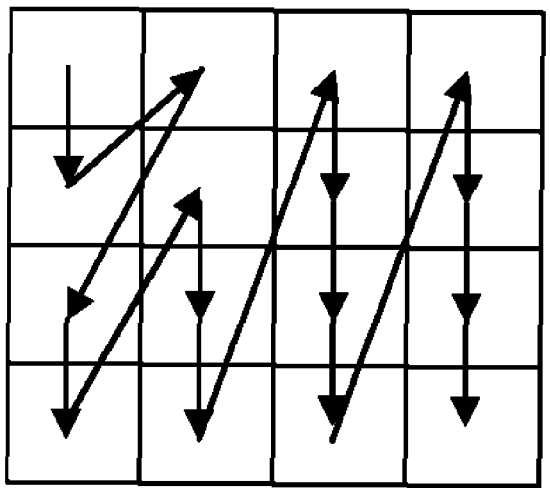
FIG. 5B illustrates an alternative scan pattern of a 4×4 matrix useful for interlaced sources.

In typical video program material, the most significant DCT coefficients are generally found in or near the top-left corner of the matrix. After weighting, low-value coefficients might be truncated to zero. More efficient transmission can be obtained if all of the non-zero coefficients are sent first, followed by a code indicating that the remainder are all zero. Scanning is a technique that increases the probability of achieving this result, because it sends coefficients in descending order of magnitude probability. In a non-interlaced system, the probability of a coefficient having a high value is highest in the top-left corner and lowest in the bottom right corner. As shown in FIG. 5A, 45 degree diagonal zigzag scan is the preferred sequence to use in that case. In FIG. 5B, an alternative scan pattern is shown that may be used for field coded pictures in the context of H.264/AVC. In a field coded picture, a 4×4 DCT block from one field extends over twice the vertical screen area, so that for a given picture detail, vertical frequencies will appear to be twice as great as horizontal frequencies. Thus, the ideal scan for a field coded picture will be on a diagonal that is twice as steep. FIG. 5B shows that a given vertical spatial frequency is scanned before scanning the same horizontal spatial frequency. In FIG. 4, a zigzag scan of matrix 405 can result in the string of frequency coefficients 406.

In order to design an optimal quantizer in the sense of rate-distortion optimization, the distortion and the number of bits required to encode each quantization level should be known. As shown in FIG. 6A, an exemplary method for rate-distortion optimized quantization can comprise determining a distortion corresponding to each quantization level at 601a, determining a number of bits required to encode a level at 602a, and selecting the level that minimizes a rate-distortion cost composed of the distortion and the bits at 603a.

Figure 1A:
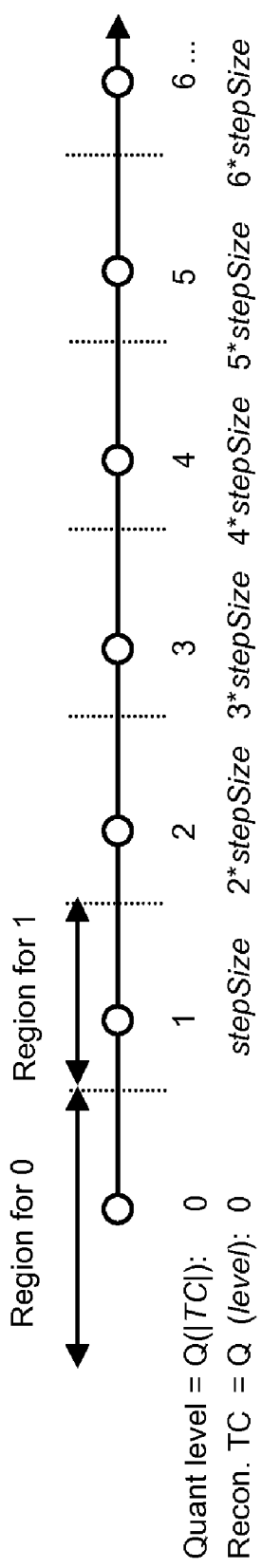
FIG. 1A illustrates a quantization scheme for MPEG and H.26x video coding standards without dead zone.
Figure 1B:
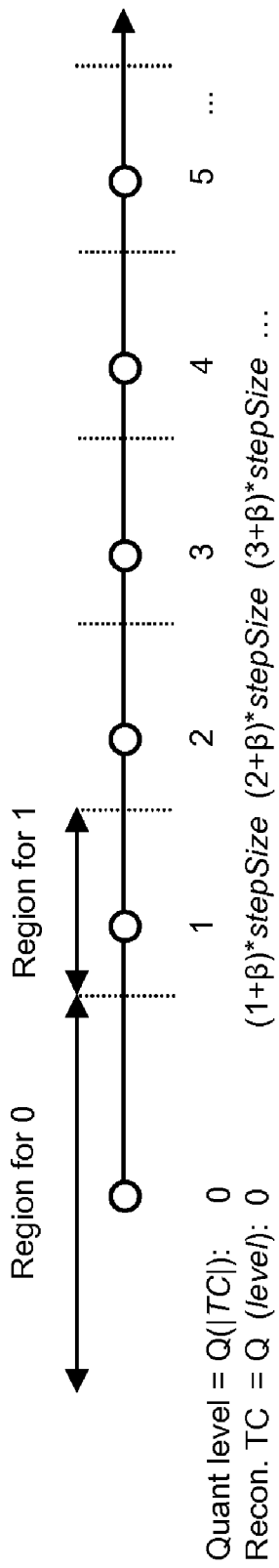
FIG. 1B illustrates a quantization scheme for MPEG and H.26x video coding standards with dead zone.

Computing the distortion is straightforward. The sum of squared value of a difference between each DCT coefficient and its reconstructed coefficient over all the 4×4 coefficients can be used. Reconstructed coefficients can usually be obtained from quantization level (i.e. quantized DCT coefficient) by one addition and one multiplication, as seen in FIG. 1A and FIG. 1B.

Determining the number of bits to encode each quantization level is not as straightforward as computing the distortion. Determining a number of bits required to encode a level can be performed by an entropy code table look-up utilizing a plurality of entropy code tables. The plurality of entropy code tables can be generated prior to the table look-up. An exemplary method is shown in FIG. 6B, determining a number of bits can comprise receiving an initial probability distribution at 601b, inputting at least one level value into an entropy encoder initialized with the initial probability distribution at 602b, receiving an output codeword from the encoder at 603b, forming an entropy code table from the output codeword at 604b, and indexing a different table out of K tables according to a predetermined value at 605b.

Figure 6C:
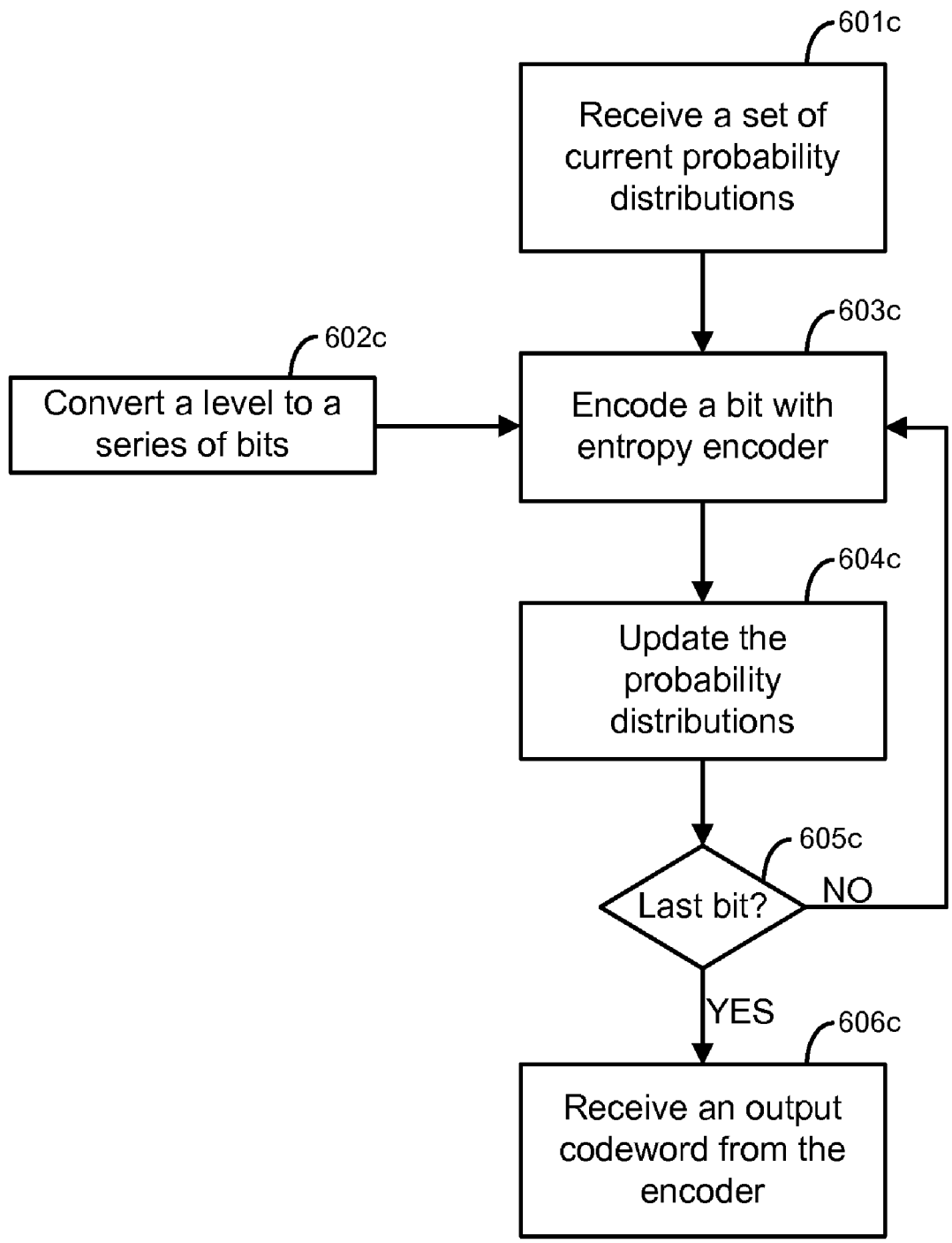
FIG. 6C is a flow diagram illustrating steps in an exemplary method for determining a number of bits required to encode a quantization level.

Another exemplary method for determining the number of bits to encode each quantization level is shown in FIG. 6C, determining a number of bits can comprise receiving a set of current probability distributions at 601c, converting a quantization level into a series of bits at 602c, inputting a bit into an entropy encoder with the set of current probability distributions at 603c, updating the set of current probability distributions according to the bit processed at 604c, determining if the bit is the last bit forming the quantization level at 605c, and, if the bit is not the last bit, receiving an output codeword from the encoder at 606c. If the bit is the last bit at 605c, the method can return to 603c. Since this process is performed for each bit instead of level and requires update of the probability distribution after processing each bit, it can be computationally demanding.

The predetermined value can be the number of consecutive zero levels, r, before a nonzero coefficient in encoders that encode (r, l) where l is level for the current coefficient. The predetermined value can be a context number for a transform coefficient in encoders using CAVLC (Context-adaptive variable length coding). The predetermined value can be a component index in encoders using CABAC (Context-adaptive binary arithmetic coding).

The entropy code tables can be designed offline and quantization can be performed by a simple table look up with one of the K tables.

Some video coding standards employ more than one entropy code table in encoding quantization levels while other coding standards employ only one fixed table. Context adaptive entropy coding in H.264 is an example of the former and Huffman coding in MPEG-2 is an example of the latter. In the case of using CABAC (Context-based Adaptive Binary Arithmetic Coding) in H.264, the binary arithmetic code table changes adapting to the local characteristic, not explicitly for each quantization level, but for binary values. So, in the case of using CABAC, fixed code tables can be used for all the quantization levels instead of encoding each bit separately in order to reduce the complexity to design an optimal quantizer.

Figure 7:
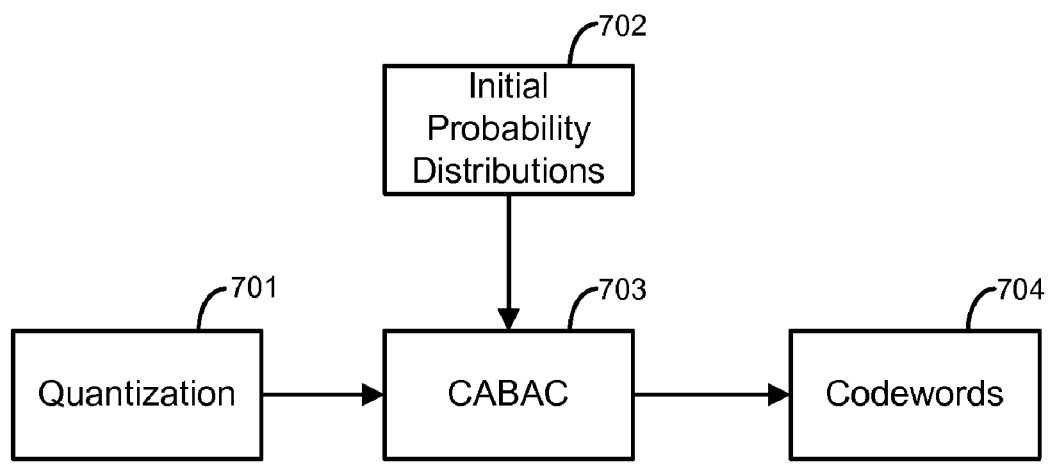
FIG. 7 is a flow diagram illustrating steps in an exemplary method for determining a number of bits required to encode a quantization level.

An initial probability distribution provided by the standard such as H.264/AVC [3] can be used to design code tables for level. As can be seen in FIG. 7, a one or more possible quantization level values 701 can be input into a CABAC encoder 703 initialized with context based probability distributions 702, and the output codewords 704 can be stored to form entropy code tables. One or more different entropy code tables can be generated, for example, intra luminance block (indexed by 0), inter luminance block (1), intra chrominance block (2), and inter chrominance block (3). Using the one or more tables designed, the number of bits can be estimated by a simple table look-up.

The one or more entropy code tables can encode level (=Q(|TC|)). The tables can be indexed by, for example, k, k=0, 1, 2, . . . . In addition, it can be assumed that which table to use before quantizing a specific transform coefficient it is known.

Examples are:
(1) In MPEG2 and H.263, k=run, i.e., the number of consecutive zero quantization levels before the current coefficient,
(2) In the case of using CAVLC (Context-adaptive variable length coding) in H.264, k=context number for the transform coefficient, and
(3) In the case of CABAC in H.264, k=component index, as shown above.

The number of bits to encode level with code table k can be denoted as R(k, level) and the associated distortion can be denoted as D(TC, level). Then, an optimal quantization level for TC for the code table k can be obtained as follows:

$$\text{level}(k,TC)=\text{minimize}\{\text{Cost}(i)=D(TC,i)+\lambda*R(k,i)\},$$
$$i \in \{0,1,2,\ldots\} \quad \text{Eq. (3)}$$

where $\lambda$ is the Lagrange multiplier that can be set to $\sqrt{0.85*2^{QP/4.0}}$ as an example. The same process can be repeated for all the k's and TC's of interest to build k different quantization tables each of which maps TC to level.

These tables can be designed offline and quantization with this approach can be performed, for example, by a simple table look up with one of the k tables. This quantization scheme is simpler than the conventional one defined as in Eqs. (1) and (2) that require addition and division operations.

After quantizing each of the transform coefficients in a block, a decision can be made whether or not to send the quantized levels to the decoder. In most video coding standards, the encoder sends to the decoder a flag indicating whether the block has non-zero quantized coefficients or not. If the flag says there is no non-zero level in the block, there is no more data to be sent following the flag. The number of bits for nonzero levels is dependent on location of the nonzero levels and their values. Sometimes, the encoder spends a large number of bits to send just one or two nonzero coefficient(s), especially when the nonzero levels represent high frequency components. This is not efficient in the sense of rate-distortion tradeoff. In this case, it would be more efficient to force these nonzero levels to be zero and skip the block from further encoding. Meanwhile, blocks with much information are skipped; it may hurt the perceptual quality of reconstructed video. Therefore, a decision can be made considering the visibility of the distortion as well as the rate-distortion tradeoff. An example of this approach can be found in the H.264 encoder implementation in where runs of zeros and values of levels are examined to skip blocks without causing visual artifacts. This simple approach works reasonably well, but it leaves room for further improvement since it does not consider the rate-distortion tradeoff.

Figure 8A:
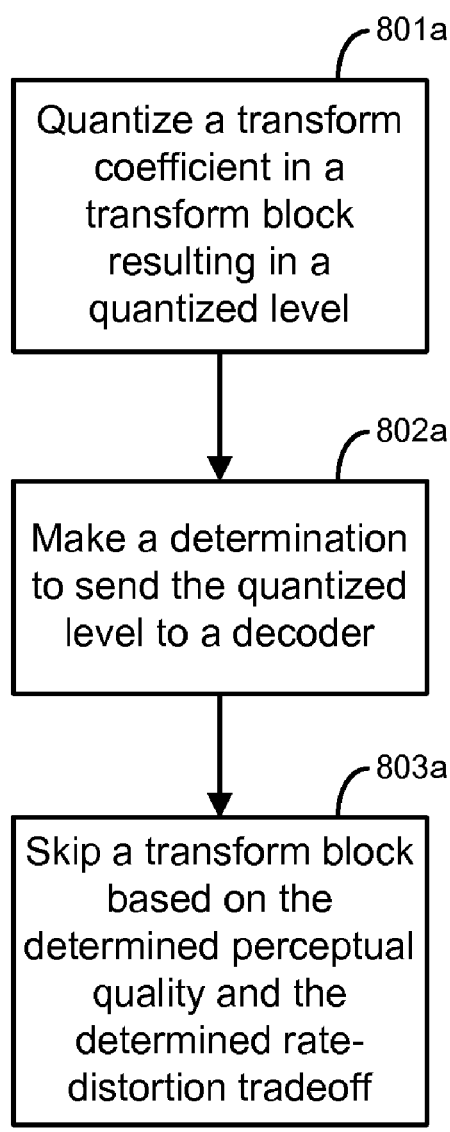
FIG. 8A is a flow diagram illustrating steps in an exemplary method for skipping transform blocks.
Figure 8B:
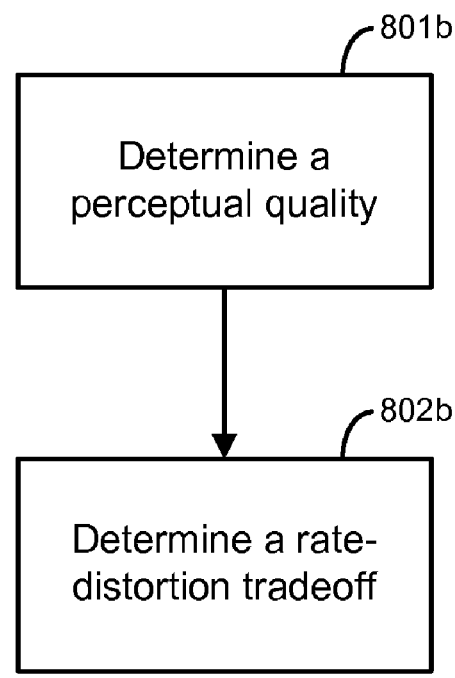
FIG. 8B is a flow diagram illustrating steps in an exemplary method for determining to send the quantized level to a decoder.

An exemplary method for skipping transform blocks is illustrated in FIG. 8A. A method for skipping transform blocks can comprise quantizing a transform coefficient in a transform block resulting in a quantized level at 801a, making a determination to send the quantized level to a decoder at block 801b, and skipping a transform block based on a determined perceptual quality and the determined rate-distortion tradeoff. As shown in FIG. 8B, making a determination to send the quantized level to a decoder can comprise determining a perceptual quality at 801b and determining a rate-distortion tradeoff at 802b.

Determining a perceptual quality can comprise determining if the block does not belong to a macroblock where a human visual system is very sensitive to the distortion, determining if the block has a quantized level greater than 1, and determining if the block contains not more than a predetermined number of nonzero levels.

Macroblocks can be categorized into five classes and the perceptual class can be zero for macroblocks where a human visual system is very sensitive to the distortion.

The predetermined number can be 3 in 4×4 blocks in H.264/AVC. The predetermined number can be 4 in 8×8 blocks in MPEG2.

Determining a rate-distortion tradeoff can comprise determining an increase of distortion and bit savings from skipping the block and determining if a rate-distortion tradeoff condition is met. The rate-distortion tradeoff condition can be $D_{skip}<D_{org}+\lambda*R_{org}$, where $D_{org}$ is distortion and $R_{org}$ is bits when the block is encoded without skipping, and $D_{skip}$ is the distortion when the block is skipped.

This method of skipping transform blocks can take into account the rate-distortion tradeoff as well as the perceptual quality of reconstructed video. In order not to hurt perceptual quality of video, only blocks that meet the following exemplary parameters as candidates for the second check-up of rate-distortion tradeoff can be considered:
1) The block does not belong to a macroblock where the human visual system is very sensitive to the distortion. In the perceptual approach that classifies macroblocks into 5 classes, the perceptual class for such macroblocks is 0.
2) The block does not have quantized levels greater than 1.
3) The block contains not more than max_skip nonzero levels. An example for max_skip is 3 in 4×4 blocks in H.264. An example for max_skip is 4 in 8×8 blocks in MPEG2. max_skip can be determined by a plurality of methods, as known to one skilled in the art.

Then, the increase of distortion and bit savings from skipping the block can be computed and if the following exemplary condition is met the block can be skipped:

$$D_{skip}<D_{org}+\lambda*R_{org}, \quad \text{Eq. (4)}$$

where $D_{org}$ and $R_{org}$ are respectively distortion and bits when the block is encoded without skipping, and $D_{skip}$ is the distortion when the block is skipped. Notice that no bits are to be sent when skipped. The $\lambda$ is the Lagrange multiplier that can be set to $\sqrt{0.85*2^{QP/4.0}}$ as an example.

Computing $D_{skip}$ and $D_{org}$ in Eq. (4) is straightforward, and it is also simple to compute $R_{org}$ in video encoders that employ fixed code tables, for example, MPEG2 and H.263. However, in the case of using CABAC in H.264, it requires very extensive computation to compute $R_{org}$ due to the high complexity of CABAC. To reduce the computation, $R_{org}$ can be estimated using the fixed code tables designed as described above (See FIG. 7) instead of actually encoding the transform block with CABAC.

The last stage in the spatial compression process can employ entropy coding such as run length coding (RLC) and/or variable length coding (VLC). Entropy coding assigns symbols to code words based on the occurrence frequency of the symbols. Symbols that occur more frequently are assigned short code words while those that occur less frequently are assigned long code words. Compression is achieved by the fact that overall the more frequent shorter code words dominate. In video, not all spatial frequencies are present simultaneously; therefore, the DCT coefficient matrix will have zero terms in it. Requantization will increase the number of zeros by eliminating small values. Despite the use of scanning, zero coefficients will still appear between the significant values. RLC allows these coefficients to be handled more efficiently. Where repeating values, such as a string of zeros, are present, RLC simply transmits the number of zeros rather than each individual bit. The probability of occurrence of particular coefficient values in video can be studied. In practice, some values occur very often; others occur less often. This statistical information can be used to achieve further compression using VLC. Frequently occurring values are converted to short code words, and infrequent values are converted to long code words. To aid decoding, no code word can be the prefix of another.

The following example is put forth so as to provide those of ordinary skill in the art with a complete disclosure and description of how the articles, devices and/or methods claimed herein can be made and evaluated, and are intended to be purely exemplary and are not intended to limit the scope of the methods and systems. Efforts have been made to ensure accuracy with respect to numbers, but some errors and deviations should be accounted for.

The quantization methods disclosed were implemented on the H.264 Reference Software platform, and the performance evaluated by encoding several standard test sequences in constant quality coding mode (QP for I and P pictures=30, and QP for B pictures=32). The sequences used were 720 samples/line*480 lines, 4:2:0, 8 bits resolution, and about 200 frames each. The numbers shown in Table 1 are differences of PSNR and bits for the disclosed methods from those for conventional methods. As can be seen in the table, each of the disclosed methods provides about 0.1 dB gain over the conventional methods.

TABLE 1

Performance evaluation of the disclosed methods applied to an H.264 encoder

| Sequences | RD Optimized Quantization | | RD Optimized Skip of Blocks | |
|---|---|---|---|---|
| | Diff. in PSNR (dB) | Diff. in Bits (%) | Diff. in PSNR (dB) | Diff. in Bits (%) |
| Bball | 0.11 | 1.96 | 0.09 | −0.38 |
| BBCdisk | 0.08 | 2.31 | 0.22 | 4.13 |
| Cartoon | 0.11 | 1.42 | 0.07 | −0.66 |
| EBU_test | 0.13 | 1.50 | −0.12 | −4.84 |
| Flower | 0.14 | 2.55 | −0.17 | −5.88 |
| Football | 0.12 | 1.91 | 0.12 | −0.02 |
| Mobile | 0.14 | 1.92 | −0.03 | −3.34 |
| Moving_text | 0.15 | 1.77 | 0.14 | 0.27 |
| Music | 0.12 | 2.07 | −0.02 | −2.75 |
| Rower | 0.16 | 1.55 | 0.07 | −1.13 |
| Susie | 0.11 | 2.32 | 0.28 | 9.28 |
| Tree | 0.16 | 0.91 | 0 | 1.21 |
| Waterfall | 0.1 | 1.75 | 0.19 | 6.62 |
| Average | 0.125 | 1.90 | 0.065 | −1.49 |

An implementation of the methods disclosed herein can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed system and method of the present methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

While the methods and systems have been described in connection with preferred embodiments and specific examples, it is not intended that the scope of the methods and systems be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

The references include:

[1] ITU-T and ISO/IEC JTC 1, "Generic coding of moving pictures and associated audio information—Part 2: Video (ITU-T Rec. H.262|ISO/IEC 13818-2: MPEG2)," November 1994.

[2] ITU-T, "Video coding for low bitrate communication," ITU-T Recommendation H.263; version 1, November 1995; version 2, January 1998; version 3, November 2000.

[3] ITU-T and ISO/IEC JTC 1, "Advanced video coding for generic audiovisual services (ITU-T Rec. H.264|ISO/IEC 14496-10 AVC)," May 2003.

[4] Joint Video Team (JVT) of ITU-T and ISO/IEC JTC 1, "H.264/AVC Reference Software: Version 9.2," Nov. 22, 2004.

It will be apparent to those skilled in the art that various modifications and variations can be made in the present methods and systems without departing from the scope or spirit of the methods and systems. Other embodiments of the methods and systems will be apparent to those skilled in the art from consideration of the specification and practice of the methods and systems disclosed herein. It is intended that the specification and examples be considered as exemplary only, with a true scope and spirit of the methods and systems being indicated by the following claims.

The invention claimed is:

1. A computer-implemented method for rate-distortion optimized quantization comprising:
    determining a distortion corresponding to each level at one or more processors;
    determining a number of bits required to encode a level by a table look-up using a plurality of entropy code tables, wherein designing the plurality of entropy code tables comprises executing computer executable code operable to cause one or more processors to perform a process comprising:
        receiving an initial probability distribution;
        inputting at least one level value into an entropy encoder initialized with the initial probability distribution;
        receiving an output codeword from the encoder;
        forming an entropy code table from the output codeword; and
        indexing a different table out of K tables according to a predetermined value; and
    selecting the level that minimizes a rate-distortion cost composed of the distortion and the bits.

2. The method of claim 1, wherein, the plurality of entropy code tables are designed prior to the table look-up.

3. The method of claim 1, wherein the predetermined value is the number of consecutive zero levels, r, before a nonzero coefficient in encoders that encode (r, l) where l is level for the current coefficient.

4. The method of claim 1, wherein the predetermined value is a context number for a transform coefficient in encoders using CAVLC (Context-adaptive variable length coding).

5. The method of claim 1, wherein the predetermined value is a component index in encoders using CABAC (Context-adaptive binary arithmetic coding).

6. The method of claim 1, wherein the entropy code tables are designed offline and quantization is performed by a simple table look up with one of the K tables.

7. A computer-implemented method for rate-distortion optimized quantization comprising:
    determining a distortion corresponding to each level at a processor;
    determining a number of bits required to encode a level at a processor, comprising:
        receiving a set of current probability distributions;
        converting a quantization level into a series of bits;
        inputting a current bit into an entropy encoder with the set of current probability distributions;
        updating the set of current probability distributions according to the current bit processed;
        determining if the current bit is the last bit forming the quantization level; and
        receiving an output codeword from the encoder; and
    selecting the level that minimizes a rate-distortion cost composed of the distortion and the bits.

8. The method of claim 7, further comprising:
    repeating the steps of inputting and updating until the current bit is the last bit.

* * * * *